US009761029B2

(12) United States Patent
Reddy et al.

(10) Patent No.: US 9,761,029 B2
(45) Date of Patent: Sep. 12, 2017

(54) DISPLAY THREE-DIMENSIONAL OBJECT ON BROWSER

(71) Applicant: HEWLETT-PACKARD DEVELOPMENT COMPANY, L.P., Houston, TX (US)

(72) Inventors: Prakash Reddy, Palo Alto, CA (US); Robert D. Shur, Palo Alto, CA (US); Deivanayagam Ramakrishnan, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 227 days.

(21) Appl. No.: 14/624,173

(22) Filed: Feb. 17, 2015

(65) Prior Publication Data
US 2016/0240014 A1 Aug. 18, 2016

(51) Int. Cl.
*G06F 17/21* (2006.01)
*G06T 11/60* (2006.01)
*G06F 17/30* (2006.01)
*G06F 17/24* (2006.01)

(52) U.S. Cl.
CPC .......... *G06T 11/60* (2013.01); *G06F 17/3005* (2013.01); *G06F 17/30061* (2013.01); *G06F 17/30126* (2013.01); *G06F 17/30861* (2013.01); *G06F 17/30899* (2013.01)

(58) Field of Classification Search
CPC .................................................. G06F 3/0484
See application file for complete search history.

(56) References Cited

U.S. PATENT DOCUMENTS

| 7,277,572 | B2 | 10/2007 | MacInnes et al. |
| 7,710,415 | B2 * | 5/2010 | Jennings, Jr. ........... G06T 19/20 345/419 |
| 7,859,551 | B2 | 12/2010 | Bulman et al. |
| 8,456,467 | B1 | 6/2013 | Hickman et al. |

(Continued)

FOREIGN PATENT DOCUMENTS

WO  WO-2013074568  5/2013

OTHER PUBLICATIONS funkypidgeon.com   http://www.funkypigeon.com/Pages/Mugs.aspx?ProductId=111118.
(Continued)

*Primary Examiner* — James J Debrow
(74) *Attorney, Agent, or Firm* — HP Inc. Patent Department

(57) ABSTRACT

Examples disclosed herein relate to a three-dimensional object to be displayed on a browser. Examples include to acquire, from a remote system, a three-dimensional object to be displayed in a browser of a computing device. The computing device to display an active region edit interface on the browser. The computing device to acquire an edit request for an active region of the three-dimensional object in the active region edit interface. The computing device to provide, to the remote system, the edit request for the active region of the three-dimensional object. The computing device to acquire, from the remote system, an edited three-dimensional active region corresponding to the edit request for the active region. The computing device to display the edited three-dimensional active region as part of the three-dimensional object on the browser.

15 Claims, 3 Drawing Sheets

(56) References Cited

U.S. PATENT DOCUMENTS

| | | | |
|---|---|---|---|
| 8,570,343 B2 | 10/2013 | Halstead | |
| 8,860,717 B1 | 10/2014 | Zeiger et al. | |
| 2001/0043209 A1* | 11/2001 | Nagakura | G06T 17/10 |
| | | | 345/419 |
| 2008/0246757 A1* | 10/2008 | Ito | G06T 15/10 |
| | | | 345/419 |
| 2009/0237411 A1 | 9/2009 | Gossweiler et al. | |
| 2013/0076727 A1 | 3/2013 | Rolleston et al. | |
| 2013/0077113 A1 | 3/2013 | Rolleston et al. | |
| 2014/0035900 A1 | 2/2014 | Slavin et al. | |
| 2014/0125649 A1 | 5/2014 | Carlin | |
| 2015/0172773 A1* | 6/2015 | Klappert | H04N 21/47815 |
| | | | 705/26.5 |
| 2016/0086258 A1* | 3/2016 | Romes | B29C 67/0088 |
| | | | 705/27.1 |

OTHER PUBLICATIONS

Rocscience. "RS3 3D Meshing and Customization," (Research Paper). Nov. 1, 2013. 8 pages, available at http://www.rocscience.com/library/rocnews/fall2013/RS3_3D_Meshing-Customization-Developers-Tip.pdf.

shapesmith.net, Parametric, open Source, 3D Modeling in your browser. http://shapesmith.net/.

Shapeways, Inc. 3D Modeling in 3D Studio Max for Shapeways. http://www.shapeways.com/tutorials/3d_studio_max_for_shapeways.

\* cited by examiner

DISPLAY THREE-DIMENSIONAL OBJECT ON BROWSER

BACKGROUND

The number of three-dimensional (3-D) objects displayed on a two-dimensional (2-D) display has been increasing. Various 3-D objects may be displayed on a computing device. The increased use of 3-D printers is one reason for the increase in the display of 3-D objects on 2-D displays. For example, in order to allow a user to preview a print job request of a 3-D object, the 3-D object is displayed on a display of a computing device.

BRIEF DESCRIPTION OF THE DRAWINGS

The following detailed description references the drawings, wherein.

DETAILED DESCRIPTION

A "computing device" or 'device' may be a desktop computer, laptop (or notebook) computer, workstation, tablet computer, mobile phone, smartphone, smart watch, smart wearable glasses, smart device, server, blade enclosure, imaging device, or any other processing device or equipment with an transceiver, transverters, repeaters, etc. to access a network. The computing device may be to access a wireless network. An "imaging device" may be a hardware device, such as a printer, multifunction printer (MFP), or any other device with functionalities to physically produce graphical representation(s) (e.g., text, images, models etc.) on paper, photopolymers, thermopolymers, plastics, composite, metal, wood, or the like, in some examples, an MFP may be capable of performing a combination of multiple different functionalities such as, for example, printing, photocopying, scanning, faxing, etc.

To display a 3-D object two processing intensives phases occur, the generation of the 3-D object and the display of the 3-D object. To generate a 3-D object, a model or scene file associated with the 3-D object to be displayed is generated by a computing device. In other words, generation of a 3-D object yields 3-D object data. To display the 3-D object, a device may render the generated model or scene file of the 3-D object to be in a displayable form. As used herein to "render" refers to a process of producing an image based on the 3-D object data. In some examples, the generation of a 3-D object and the display of the 3-D object may occur in different devices connected via network connection to reduce a processing load. However, due to the large amount of data in a generated 3-D object, the transmission time of the generated 3-D object between devices may be increased. In some examples, the editing of the 3-D object displayed on a first device which was generated by a second device may also experience increased time due to the increased transmission time.

To address these issues, in the examples described herein, a method to reduce the processing load and transmission time for displaying a 3-D object on a device connected to a remote system to provide the 3-D object via a network connection. In examples, a generated 3-D object is provided by a remote system to a device via a network connection. In such examples, the 3-D object includes an active region which may be edited in response to an edit request from the device. In such an example, an edited active region of the 3-D object is generated according to the edit request and provided to the device to be displayed on a browser.

Figure 1:
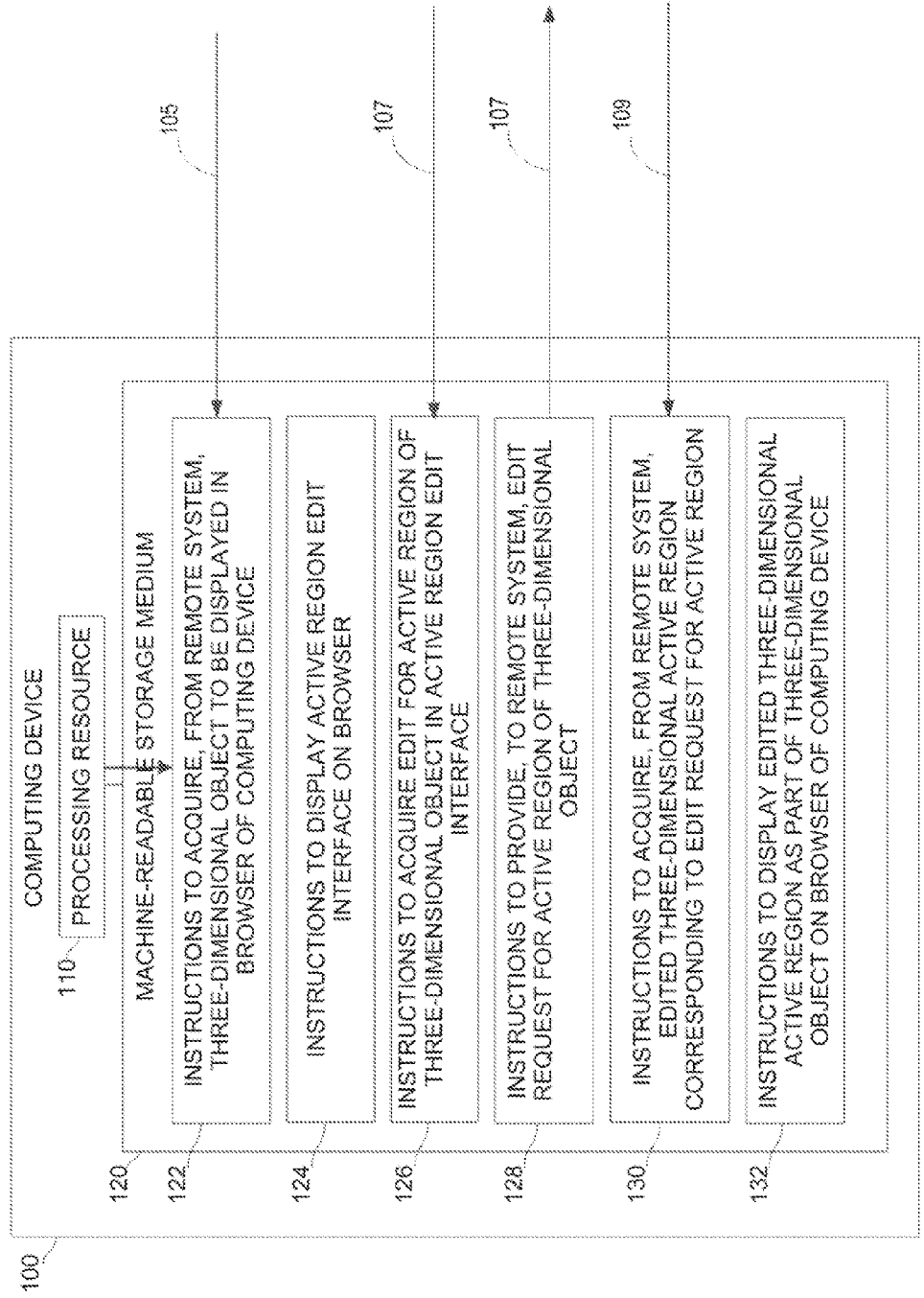
FIG. 1 is a block diagram of an example computing device to display a three-dimensional object on a browser from a remote system.

Referring now to the drawings, FIG. 1 is a block diagram of an example computing device 100 to display a three-dimensional object on a browser from a remote system. In the example of FIG. 1, computing device 100 includes a processing resource 110 and a machine readable storage medium 120 comprising (e.g., encoded with) instructions 122, 124, 126, 128, 130 and 132 executable by processing resource 110. In some examples, storage medium 120 may include additional instructions. In some examples, instructions 122, 124, 126, 128, 130, 132 and any other instructions described herein in relation to storage medium 120, may be stored on a machine-readable storage medium remote from but accessible to computing device 100 and processing resource 110 (e.g., via a computer network). In some examples, instructions 122, 124, 126, 128, 130 and 132 may be instructions of a computer program, computer application (app), agent, or the like, of computing device 100. In other examples, the functionalities described herein in relation to instructions 122, 124, 126, 128, 130 and 132 may be implemented as engines comprising any combination of hardware and programming to implement the functionalities of the engines, as described below.

In examples described herein, a processing resource may include, for example, one processor or multiple processors included in a single computing device (as shown in FIG. 1) or distributed across multiple computing devices. A "processor" may be at least one of a central processing unit (CPU), a semiconductor-based microprocessor, a graphics processing unit (GPU), a field-programmable gate array (FPGA) to retrieve and execute instructions, other electronic circuitry suitable for the retrieval and execution of instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

As used herein a "remote system" or a "remote management system" refer to a computing device or a plurality of computing devices located at a remote location that may provide data to a computing device via a network. In some examples, the network may be at least one of a wireless personal area network (WPAN), wireless mesh network, wireless metropolitan area networks, WiMAX, wireless wide area networks, cellular network, Global System for Mobile Communications (GSM), Personal Communications Service (PCS), Digital Advanced Mobile Phone Service, Wi-Fi network, Wi-Lan, and a general packet radio service (GPRS) network. The remote system may be connected to a computing device through a wired connection (e.g., local area network (LAN), etc.) or a wireless connection (e.g., wireless local area network (WLAN), Wi-Fi, Bluetooth, etc.).

In the example of FIG. 1, instructions 122 may passively acquire (i.e., receive) or actively acquire (e.g., retrieve) with computing device 100 from a remote system a three-dimensional (3-D) object 105 to be displayed in a browser of computing device 100. In an example, the browser may be displayed on a display coupled to computing device 100. As used herein a "browser" or "web browser" refers to an application of a computing device to retrieve, present, and traverse information from the World Wide Web via network. In an example, the browser may be at least one of Google® Chrome, Apple® Safari, Microsoft® Internet Explorer, Modzilla Firefox, etc.

In some example, 3-D object 105 may be a single 3-D object to be displayed on the browser or part of a larger 3-D image to be displayed on the browser. For example, the 3-D object may be the display of a 3-D object to be printed by an imaging device, such as a 3-D imaging device. In such an example, the 3-D object may be displayed in a manner to allow for manipulation of the 3-D object on the browser. For example, 3-D object 105 may be rotated about an axis or a point on the browser. In other examples, the size, position, color, shading, pattern, etc. of 3-D object 105 may be manipulated on the browser.

In the example of FIG. 1, 3-D object 105 includes an active region to be edited via the browser. In some examples, the active region of 3-D object 105 may be determined by the remote system. For example, computing device 100 may acquire information about the active region while acquiring the 3-D object 105. In other examples, the browser of computing device 100 may detect an active region in the 3-D object 105 acquired from the remote system. In yet another example, the active region of the 3-D object 105 may be established according to instructions received via an active region definition interface displayed on the browser. In such an example, the active region definition interface may receive an active region definition request to define a portion of 3-D object 105 as an active region and computing device 100 may provide the instructions to the remote system.

In instructions 124, the computing device 100 may display an active region edit interface in a browser of the computing device 100. In some examples, the active region edit interface may be displayed as a pop-up message on the browser of computing device 100. The active region edit interface may include an input area to receive an edit request to the active region of 3-D object 105 via the browser of computing device 100.

In instructions 126, computing device 100 may passively acquire (i.e., receive) or actively acquire (e.g., retrieve) an edit request 107 for the active region of 3-D object 105 on the browser. In some examples, edit request 107 may include instructions to display specific shapes or text as cut-outs in the active region. For example, edit request 107 may include instructions to display a cut-out in the shape of a heart in the active region of 3-D objection 105. In another examples, edit request 107 may include instructions to display a cut-out in the shape of the text "Emily" in the active region. In other examples, edit request 107 may include instructions to add an additional 3-D shape to the active region. For examples, edit request 107 may include instructions to add a parallelogram of a certain dimensions to extend from the active region of 3-D object 105.

In instructions 128, computing device 100 may provide, to the remote system edit request 107 for the active region of 3-D object 105. In some examples, computing device 100 may provide edit request 107 to the remote system via a network connection between computing device 100 and the remote system. In such an example, the network connection may be a wired connection (e.g., local area network (LAN), etc.) or a wireless connection (e.g., wireless local area network (WLAN), Wi-Fi, Bluetooth, etc.).

In instructions 130, computing device 100 may passively acquire (i.e., receive) or actively acquire (e.g., retrieve), from the remote system, an edited 3-D active region 109 corresponding to edit request 107. In some examples, the remote system may be the same or a different remote system from which the 3-D object 105 was received. Edited 3-D active region 109 may be a rendered 3-D object of the active region corresponding to the edit request 107 acquired in instructions 126. For example, when the edit request 107 includes instructions to display a cut-out in the shape of the text "Emily" in the active region, edited 3-D active region 109 corresponding to the edit request is a 3-D model or scene file representing the active region with the text "Emily" cut-out therefrom.

In instructions 132, computing device 100 may display edited 3-D active region 109 as part of the 3-D object 105 on the browser of computing device 100. For example, the displayed edited 3-D active region 109 and 3-D object 105 when displayed on the browser together appear as one object. In such an example, edited 3-D active region 109 may be displayed to replace the active region of 3-D object 105 when displayed on the browser of computing device 100. In some examples, edited 3-D active region 109 may be displayed to replace the active region of the 3-D object 105 by a union operation to super impose the displayed edited 3-D active region 109 on the displayed 3-D object 105.

In some examples, instructions 122, 124, 126, 128, 130, and 132 may be part of an installation package that, when installed, may be executed by processing resource 110 to implement the functionalities described herein in relation to instructions 122, 124, 126, 128, 130, and 132. In such examples, storage medium 120 may be a portable medium, such as a CD, DVD, flash drive, or a memory maintained by a computing device from which the installation package can be downloaded and installed. In other examples, instructions 122, 124, 126, 128, 130, and 132 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-3.

Figure 2:
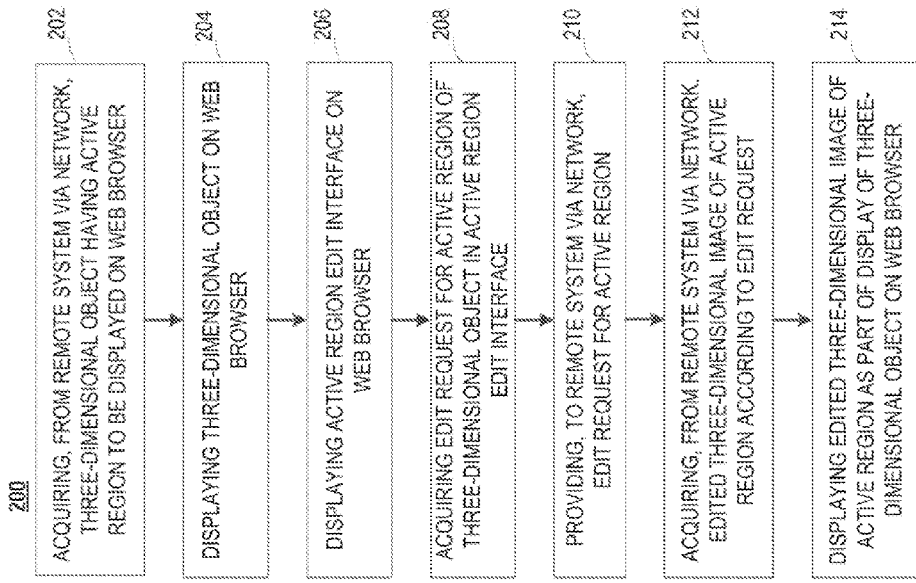
FIG. 2 is a flowchart of an example method for displaying a three-dimensional object on a web browser.

FIG. 2 is a flowchart of an example method 200 for displaying a three-dimensional object on a web browser. Although execution of method 200 is described below with reference to computing device 100 described above, other suitable systems for the execution of method 200 can be utilized. Additionally, implementation of method 200 is not limited to such examples.

At 202 of method 200, computing device 100 may acquire, from a remote system via a network, a 3-D object 105 having an active region to be displayed on a web browser. In the example of FIG. 2, the network may be at least one of a wireless personal area network (WPAN), wireless mesh network, wireless metropolitan area networks, WiMAX, wireless wide area networks, cellular network, Global System for Mobile Communications (GSM), Personal Communications Service (PCS), Digital Advanced Mobile Phone Service, Wi-Fi network, Wi-Lan, and a general packet radio service (CPRS) network. The remote system may be connected to a computing device through a wired connection (e.g., local area network (LAN), etc.) or a wireless connection (e.g., wireless local area network (MAN), Wi-Fi, Bluetooth, etc,).

At 204, computing device 100 may display the 3-D object on a web browser of computing device 100. In an example, the web browser may be any web browser to display an image on a display of computing device 100. For example, the web browser may be at least one of Google® Chrome, Apple® Safari, Microsoft® Internet Explorer, Modzilla Firefox, etc.

At 206, computing device 100 may display an active region edit interface on the web browser.

At 208, computing device 100 may passively acquire (i.e., receive) or actively acquire (e.g., retrieve) an edit request 107 for the active region of the 3-D object in the active region edit interface.

At 210, computing device 100 may provide, to the remote system via the network, edit request 107 for the active region.

At 212, computing device 100 may passively acquire (i.e., receive) or actively acquire (e.g., retrieve), from the remote system, an edited 3-D image of the active region (e.g., edited 3-D active region 109) corresponding to the edit request 107. In an example, computing device 100 may receive the edited 3-D image from the remote system via the network connection.

At 214, computing device 100 may display the edited 3-D image of the active region as part of the display of the 3-D object on the web browser. In the example of FIG. 2, when displayed jointly on the web browser, the displayed edited 3-D image of the active region and 3-D object 105 appear together as a single object. In such an example, the edited 3-D image of the active region may be displayed to replace the active region of 3-D object 105 when displayed on the web browser of computing device 100. In some examples, the edited 3-D image of the active region may be displayed to replace the active region of the 3-D object 105 by a union operation to super impose the displayed edited 3-D image of the active region on the displayed 3-D object 105 to replace the active region.

Although the flowchart of FIG. 2 shows a specific order of performance of certain functionalities, method 200 is not limited to that order. For example, the functionalities shown in succession in the flowchart may be performed in a different order, may be executed concurrently or with partial concurrence, or a combination thereof. In some examples, functionalities described herein in relation to FIG. 2 may be provided in combination with functionalities described herein in relation to any of FIGS. 1 and 3.

Figure 3:
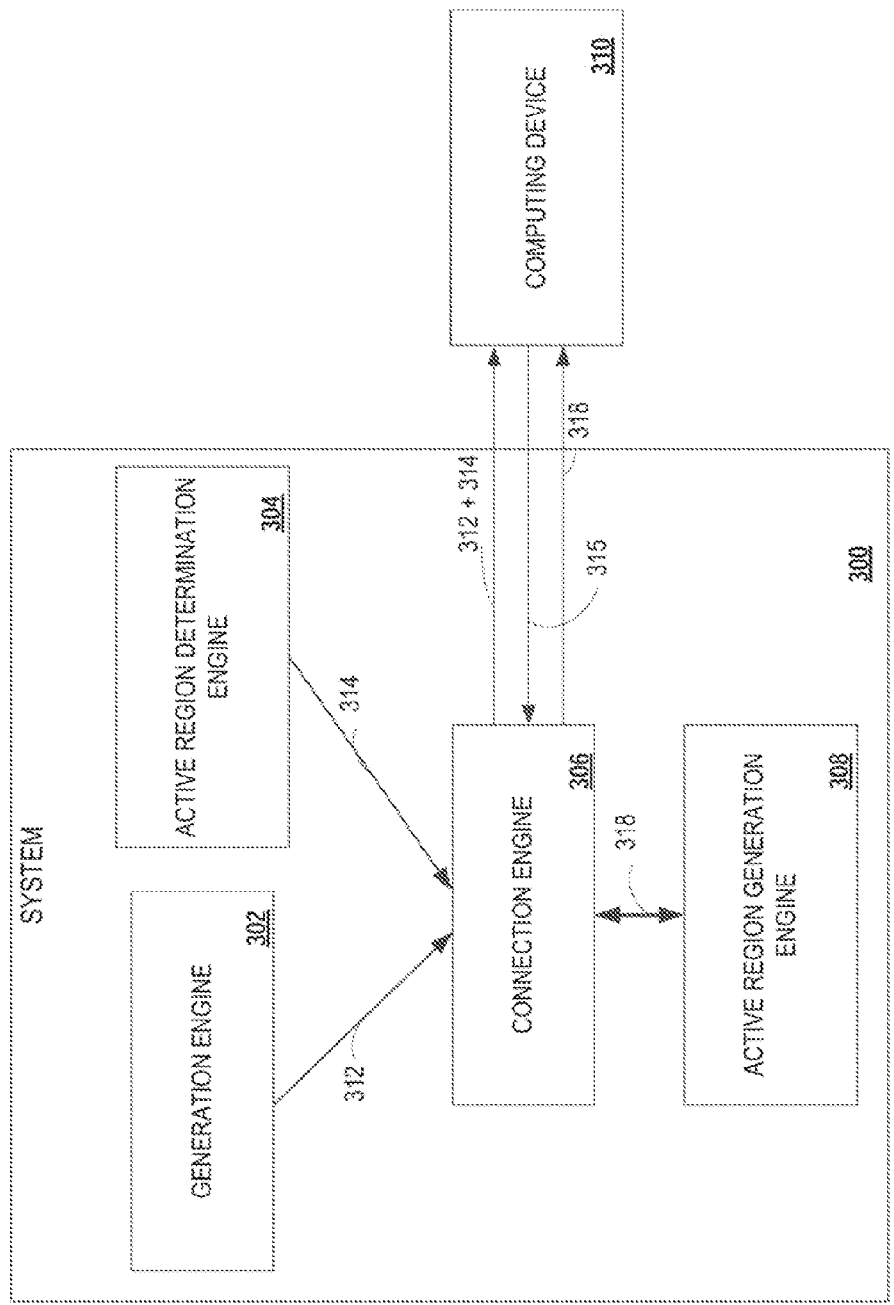
FIG. 3 is a block diagram of an example system to provide a three-dimensional object to be displayed on a web browser.

FIG. 3 is a block diagram of an example system 300 to provide a three-dimensional object to be displayed on a web browser. In the example of FIG. 3, system 300 includes at least engines 302, 304, 306, and 308, which may be any combination of hardware and programming to implement the functionalities of the engines. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 302, 304, 306, and 308. In such examples, system 300 may include the machine-readable storage medium storing the instructions and the processing resource to execute the instructions, or the machine-readable storage medium may be separate but accessible to system 300 and the processing resource.

In some examples, the instructions can be part of an installation package that, when installed, can be executed by the processing resource to implement at least engines 302, 304, 306, and 308. In such examples, the machine-readable storage medium may be a portable medium, such as a CD, DVD, or flash drive, or a memory maintained by a computing device from which the installation package can be downloaded and installed. In other examples, the instructions may be part of an application, applications, or component already installed on system 300 including the processing resource. In such examples, the machine-readable storage medium may include memory such as a hard drive, solid state drive, or the like. In other examples, the functionalities of any engines of system 300 may be implemented in the form of electronic circuitry.

In the example of FIG. 3, a generation engine 302 may generate a 3-D object 312 to be displayed on the web browser. The generation engine 302 may generate 3-D object 312 to be displayed on the web browser by generating a wire-frame model, other similar model, or a scene file to generate representations of 3-D object 312 to be displayed on the web browser.

Active region determination engine 304 may determine an active region 314 of 3-D object 312 is determined. In the example of FIG. 3, active region determination engine 304 may determine active region 314 of 3-D object 312. In some examples, active region 314 of 3-D object 312 may be determined according to an active region definition request. In some examples, the active region definition request to define a portion of 3-D object 312 as an active region may be received from a computing device displaying an active region definition interface. In some examples, the computing device displaying an active region definition interface may be part of system 300. In other examples, the computing device displaying the active region definition interface may not be part of system 300. For example, the computing device displaying the active region definition interface may be the computing device to generate an edit request for active region 314 of 3-D object 312.

Connection engine 306 may receive 3-D object 312 from generation engine 302 and active region 314 of 3-D object 312 from active region determination engine 304 may be provide 3-D object 312 and active region 314 to a computing device 310 to be displayed by the web browser of computing device 310 via a network connection. In such an example, the network connection may be a wired connection (e.g., local area network (LAN), etc.) or a wireless connection (e.g., wireless local area network (WLAN), Wi-Fi, Bluetooth, etc.).

Connection engine 306 may passively acquire (i.e., receive) or actively acquire (e.g., retrieve) an edit request 315 of active region 314 from computing device 310 via the network connection.

Active region generation engine 308 may generate an edited 3-D image 318 of active region 314 according to edit request 315. In the example of FIG. 3, edited 3-D image 318 of active region 314 may be a wire-frame model, other similar model, or a scene file to represent edited 3-D image 318 of active region 314.

Connection engine 306 may provide edited 3-D image 318 of active region 314 to computing device 310 via the network connection.

What is claimed is:

1. A non-transitory machine-readable storage medium comprising instructions that when executed by a processor cause the processor to:
   acquire, from a remote system, a three-dimensional object to be displayed on a browser of a computing device, wherein the three-dimensional object includes a region not to be edited and an active region to be edited;
   display an active region edit interface on the browser of the computing device;
   acquire an edit request for the active region of the three-dimensional object in the active region edit interface;
   provide, to the remote system, the edit request for the active region of the three-dimensional object;
   acquire, from the remote system, only an edited active region of the three-dimensional object corresponding to the edit request for the active region;
   superimpose, by the computing device, the edited active region onto the three-dimensional object to display the three-dimensional object and the edited active region as a single object; and
   display the single object with the edited active region as part of the three-dimensional object on the browser of the computing device.

2. The non-transitory machine-readable storage medium of claim 1, wherein the instructions are to cause the processor is to display, on the browser of the computing device, the edited active region before superimposing the edited active region onto the three-dimensional object.

3. The non-transitory machine-readable storage medium of claim 1, wherein, to superimpose, the instructions are to cause the processor to replace the active region of the three-dimensional object with the edited active region.

4. The non-transitory machine-readable storage medium of claim 1, wherein the instructions are to cause the processor to detect the active region when the three-dimensional object is acquired.

5. The non-transitory machine-readable storage medium of claim 1, wherein the active region is defined by the browser via an active region definition interface.

6. A method for displaying a three-dimensional object on a web browser of a computing device, comprising:
   acquiring, from a remote system via a network, a three-dimensional object having a region not to be edited and an active region to be edited;
   displaying the three-dimensional object on the web browser;
   displaying an active region edit interface on the web browser;
   acquiring an edit request for the active region of the three-dimensional object in the active region edit interface;
   providing, to the remote system via the network, the edit request for the active region;
   acquiring, from the remote system via the network, only an edited active region according to the edit request;
   superimposing, by the computing device, the edited active region onto the three-dimensional object to display the three-dimensional object and the edited active region as a single object; and
   displaying, on the browser of the computing device, the single object with the edited active region as part of the three-dimensional object.

7. The method of claim 6, further comprising: displaying the edited active region before superimposing the edited active region onto the three-dimensional object.

8. The method of claim 7, wherein superimposing includes replacing the active region of the three-dimensional object with the edited active region.

9. The method of claim 6, further comprising: detecting the active region when the three-dimensional object is acquired.

10. The method of claim 6, wherein the edit request includes instructions to cut out a specific shape or text in the active region.

11. The method of claim 6, wherein the edit request includes instructions to add additional three-dimensional shapes to the active region.

12. The method of claim 6, wherein the remote system is a remote management service.

13. A system to provide a three-dimensional object to be displayed on a web browser, comprising:
   a processor; and
   a memory storing instructions that when executed by the processor cause the processor to:
   generate the three-dimensional object to be displayed on the web browser;
   determine an active region of the three-dimensional object to be edited;
   provide the three-dimensional object and the active region of the three-dimensional object to a computing device to be displayed by a web browser via a network connection and to acquire an edit request for the active region from the computing device via the network connection;
   generate an edited active region according to the edit request; and
   transmit only the edited active region to the computing device via the network connection, wherein the computing device is to superimpose the edited active region onto the three-dimensional object to display the three-dimensional object and the edited active region as a single object.

14. The system of claim 13, wherein the computing device is to display the edited active region before superimposing the edited active region onto the three-dimensional object.

15. The system of claim 13, wherein the instructions are to cause the processor to determine the active region according to an active region definition request from the computing device.

* * * * *

UNITED STATES PATENT AND TRADEMARK OFFICE
CERTIFICATE OF CORRECTION

PATENT NO. : 9,761,029 B2
APPLICATION NO. : 14/624173
DATED : September 12, 2017
INVENTOR(S) : Prakash Reddy et al.

It is certified that error appears in the above-identified patent and that said Letters Patent is hereby corrected as shown below:

In the Claims

In Column 7, Line 34, in Claim 2, delete "processor is" and insert -- processor --, therefor.

Signed and Sealed this
Thirteenth Day of March, 2018

Andrei Iancu
*Director of the United States Patent and Trademark Office*